United States Patent [19]

Krogsrud

[11] E Re. 30,937

[45] Reissued * May 18, 1982

[54] APPARATUS FOR GAS COLLECTION IN OPEN ELECTRIC SMELTING FURNACES

[75] Inventor: Harald Krogsrud, Gjettum, Norway

[73] Assignee: Elkem-Spigerverket a/s, Oslo, Norway

[ * ] Notice: The portion of the term of this patent subsequent to Jul. 15, 1992, has been disclaimed.

[21] Appl. No.: 164,796

[22] Filed: Jun. 30, 1980

Related U.S. Patent Documents

Reissue of:

[64] Patent No.: 4,005,252
Issued: Jan. 25, 1977
Appl. No.: 614,160
Filed: Sep. 17, 1975

[51] Int. Cl.[3] ..... F27D 3/00

[52] U.S. Cl. ..... 373/8; 432/239

[58] Field of Search ..... 13/9, 10, 33; 432/151, 432/239; 204/247; 214/21

[56] References Cited

U.S. PATENT DOCUMENTS

| | | | |
|---|---|---|---|
| 2,671,124 | 3/1954 | Bagley | 13/33 X |
| 3,721,743 | 3/1973 | Shiina et al. | 13/33 X |
| 3,895,175 | 7/1975 | Krogsrud | 13/33 |

*Primary Examiner*—Roy N. Envall, Jr.
*Attorney, Agent, or Firm*—Eyre, Mann, Lucas & Just

[57] ABSTRACT

A gas collection apparatus for use in open electrical smelting furnaces is disclosed. The apparatus comprises an annular body about the outer circumference of the furnace and sealed to the top edge of the furnace on one side thereof with a sloped wall extending into the furnace on the other side to a depth below the normal height of the charge in the furnace.

4 Claims, 3 Drawing Figures

APPARATUS FOR GAS COLLECTION IN OPEN ELECTRIC SMELTING FURNACES

Matter enclosed in heavy brackets [ ] appears in the original patent but forms no part of this reissue specification; matter printed in italics indicates the additions made by reissue.

The present invention relates to open electrical smelting furnaces and in particular to a gas collection system therefor.

Furnaces for the melt electrolytic production of metals are well known in the art. In the production of metals such as silicon and silicon-containing alloys, it is quite important to be able to stoke the charge in order to prevent voids in the charge. The stoking effectively results in a levelling of the charge.

One method of collecting these gases is to use a so-called covered furnace. However, covered furnaces are not easily adaptable for stoking and therefore smelting furnaces which require stoking are usually open furnaces.

[During the smelting process, there are a considerable amount of furnace gases produced. In open furnaces these furnace gases are generally collected in a gas collection ring which surrounds the electrode at the bath surface. An alternative or additional means of collection is to have an annular body about the circumference of the furnace pot to collect the gases. In both of the above instances, the wall of the gas collecting member rests on the crust which is formed on the bath surface. In order to prevent undesirable escape of gases, there is usually employed sealing means such as granular aluminum oxide between the lower portion of the gas collecting member and the crust. It is quite important to have a good seal since the gases which are produced will frequently include CO, tar fumes, fluorine vapors and dust, all of which are detrimental to the environment and to the working conditions of the employees in the plant.]

[While the aforementioned procedure for collecting gas has been in use for a great number of years and works quite well, there are, unfortunately, drawbacks to this system which are especially important in larger plants. One of the drawbacks is that when the crust is broken from time to time to allow for supply of additional material to the charge, the gas collecting member will frequently become open thus permitting the escape of noxious gases and dust mentioned previously. This breaking of the crust can also take place at other times such as when anode effect occurs, i.e., when the contents of the molten bath has been reduced to such a low level that the voltage across the bath is raised thereby causing disruption of the crust. This action will frequently result in the release of noxious gases and dust into the pot room.]

[A further problem with this arrangement is that the layer of sealing material used on the surface of the crust, e.g., aluminum oxide, is never completely gas tight and this can lead to the release of gases, especially along the lining of the furnace pot where the stoking is generally effected.]

In accordance with the present invention, [the disadvantages of these known gas collecting systems are substantially eliminated by] *a gas collection apparatus for open electrical smelting furnaces is disclosed, comprising* a gas collecting member which is positioned about the circumference of the pot at the top thereof and has a sloped wall which extends into the charge. The degree to which the sloped wall extends into the charge will depend upon the process conditions of the furnace and is preferably determined empirically for each process. The many factors which must be included include the size of the furnace, the composition of the charge, etc. It is absolutely necessary, however, that the wall extend to a point below the normal charge level in the furnace and it will usually be located in the area of the plane of the electrode tips.

These and other advantages of the present invention may be more fully understood with reference to the drawings in which.

Figure 1:
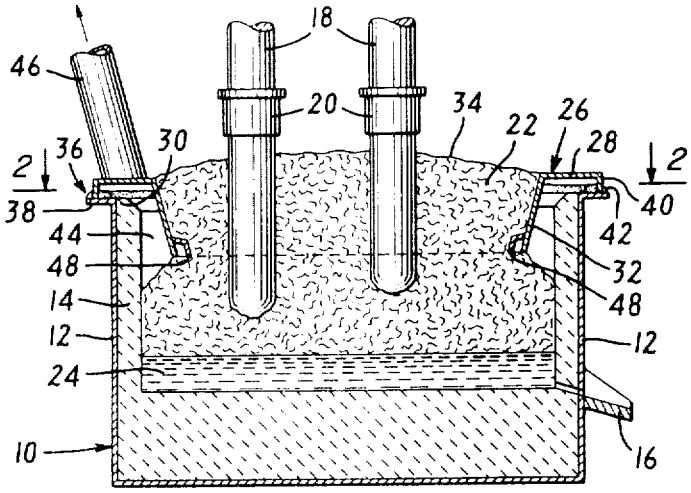
FIG. 1 shows a sectional view through a vertical section of the furnace.
Figure 2:
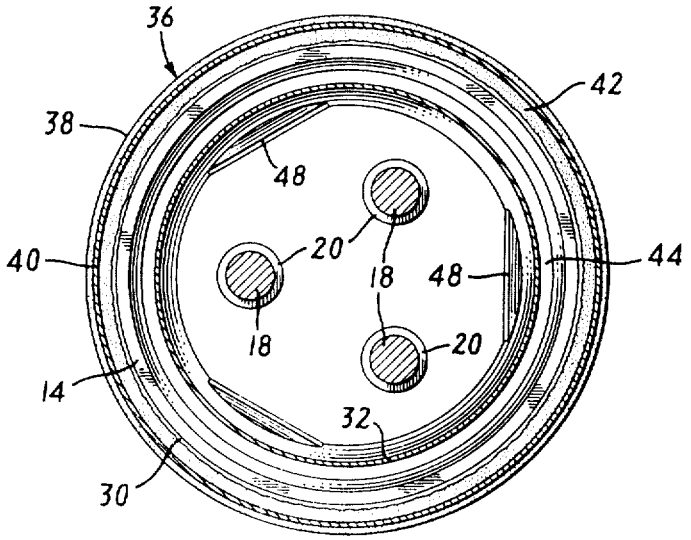
FIG. 2 shows a horizontal section along line 2—2 of FIG. 1

Referring now to the Figures there is shown an open smelting furnace pot 10 with side walls 12 having a lining 14 and a tapping spout 16. Electrodes 18 in electrode holders 20 extend into the charge 22 molten in the area 24.

In accordance with the present invention, a gas collecting member 26 is employed. The gas collecting member comprises a top member 28 positioned above the top 30 of the side wall 12 and the gas collecting member further comprises a sloping wall 32 which extends at an angle into the charge and is of a length such that it extends below the crust 34 of the charge. The gas collecting member 26 further comprises sealing means 36 between the top 30 of the wall 12 and the top member 28 of the gas collecting apparatus. In the particular case shown, the sealing means comprises a flange 38 on the top 30 of the side wall 12, a flange 40 on member 28 and a granular sealing material 42 such as sand or the like. Gases which are generated in the furnace are collected in chamber 44 formed by the side wall 12 of the furnace pot and the side wall 32 of the gas collecting apparatus and exit through exhaust pipe 46. Exhaust pipe 46 may include vacuum means such as a fan (not shown) and may further go to a gas scrubbing or other unit. While only one exhaust pipe 46 is shown, it will be appreciated that a plurality of same can be employed if desired.

It is important for effecting good seal between the wall 32 and the charge 22 that the wall 32 be sloped with respect to the vertical. The angle of slope from the vertical of the wall 32 is preferably at least 5° and is suitably from about 8° to about 30°. In general, slopes greater than 30° are not desirable since they can result in hangings on the wall 32.

Figure 3:
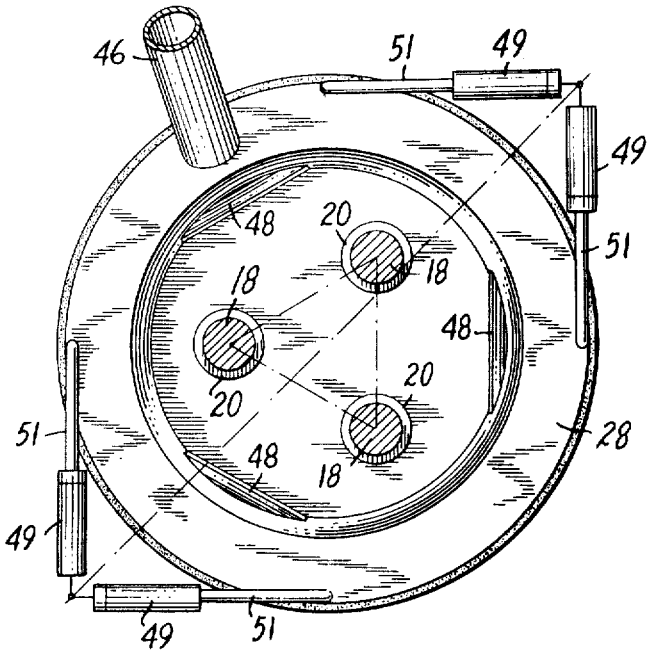
FIG. 3 shows a top view of the furnace including means for rotating a gas collecting member.

As is known from U.S. Pat. No. 3,895,175, it is highly desirable to have effective means for moving the charge in an electric smelting furnace. In accordance with the present invention, these means can be provided as for example in the form of members 48 which are chordal segments positioned at the lower end of wall 32. The entire gas collecting element can then be made movable in annular direction for example with the means illustrated and described in U.S. Pat. No. 3,895,175. Hydraulic cylinders 49 (see FIG. 3) are connected to the top member 28 to effect an oscillatory movement of the gas collecting member 26 by "push-pull" movement of the pistons 51. It will, of course, be understood that any suitable means can be employed to effect movement of the gas collecting member 26.

It will be understood that the claims are intended to cover all changes and modifications of the preferred embodiment of the invention, herein chosen for the purpose of illustration, which do not constitute departures from the spirit and scope of the invention.

What is claimed is:

1. In an open electric smelting furnace having a furnace pot for containing a charge, said furnace pot having an annular side wall, the improvement comprising gas collecting apparatus, said gas collecting apparatus comprising:

a. an annular top member spaced from the top of the said annular side wall;

b. sealing means for sealing the space between the said annular member and the top of the said annular side wall, said sealing means comprising a granular material;

c. a sloped wall spaced inwardly from the said annular side wall, said sloped wall being affixed to said annular member;

d. said sloped wall being of sufficient length to extend into the charge when the charge is at its normal operating height;

e. means for moving said sloped wall in an annular direction; and f. means on the sloped wall effective to move the charge towards the center of the furnace pot when the sloped wall is moved in annular direction.

2. The apparatus of claim 1 wherein the sloped wall is at an angle of from about 5° to about 30° with respect to the vertical.

3. The apparatus of claim 1 wherein the granular sealing material is sand.

4. The apparatus of claim 1 further including means for removing the gases collected in the gas collecting apparatus.

* * * * *